(12) United States Patent
Zhang et al.

(10) Patent No.: US 12,317,392 B2
(45) Date of Patent: May 27, 2025

(54) LED CONTROL SYSTEM

(71) Applicant: WUXI DECHIP MICROELECTRONICS CO., LTD., Wuxi (CN)

(72) Inventors: Xiancheng Zhang, Wuxi (CN); Xing'an Zhou, Wuxi (CN)

(73) Assignee: WUXI DECHIP MICROELECTRONICS CO., LTD., Wuxi (CN)

( * ) Notice: Subject to any disclaimer, the term of this patent is extended or adjusted under 35 U.S.C. 154(b) by 0 days.

(21) Appl. No.: 18/550,993

(22) PCT Filed: Sep. 10, 2021

(86) PCT No.: PCT/CN2021/117640
§ 371 (c)(1),
(2) Date: Sep. 18, 2023

(87) PCT Pub. No.: WO2022/262129
PCT Pub. Date: Dec. 22, 2022

(65) Prior Publication Data
US 2024/0172351 A1    May 23, 2024

(30) Foreign Application Priority Data

Jun. 17, 2021 (CN) .......................... 202110670723.2

(51) Int. Cl.
*H05B 47/165* (2020.01)
*H05B 45/325* (2020.01)
(Continued)

(52) U.S. Cl.
CPC ......... *H05B 47/165* (2020.01); *H05B 45/325* (2020.01); *H05B 45/375* (2020.01); *H05B 45/42* (2020.01)

(58) Field of Classification Search
CPC .. H05B 47/165; H05B 45/325; H05B 45/375; H05B 45/42; H05B 45/32; H05B 45/30;
(Continued)

(56) References Cited

FOREIGN PATENT DOCUMENTS

| CN | 101702848 A | 5/2010 |
|---|---|---|
| CN | 202353792 U * | 7/2012 |

(Continued)

OTHER PUBLICATIONS

English Translation of JP2011191642A (Year: 2011).*
International search report of PCT/CN2021/117640.

*Primary Examiner* — Daniel D Chang
(74) *Attorney, Agent, or Firm* — Hemisphere Law, PLLC; Zhigang Ma

(57) ABSTRACT

A light-emitting diode (LED) control system is provided, including: a controller (10) and an LED light string (20) electrically connected to the controller (10). The controller (10) includes a first data output port (VA) and a second data output port (VB), and is configured to send a first data signal via the first data output port (VA) and send a second data signal via the second data output port (VB); the first data signal and the second data signal have opposite phases; and the LED light string (20) is capable of receiving the first data signal and the second data signal via a data receiving port, implementing display control of LEDs according to the first data signal and the second data signal. The LED control system is simple in implementation, low in cost, and high in reliability.

9 Claims, 18 Drawing Sheets

(51) Int. Cl.
*H05B 45/375* (2020.01)
*H05B 45/42* (2020.01)

(58) Field of Classification Search
CPC .... H05B 45/3725; H05B 45/48; Y02B 20/40; G09G 3/32
See application file for complete search history.

(56) References Cited

FOREIGN PATENT DOCUMENTS

| | | | |
|---|---|---|---|
| CN | 105307315 A | | 2/2016 |
| CN | 111372350 A | | 7/2020 |
| CN | 212353792 A | | 1/2021 |
| CN | 113242628 | | 8/2021 |
| JP | 2011191642 A | * | 9/2011 |

* cited by examiner

LED CONTROL SYSTEM

TECHNICAL FIELD

The present disclosure relates to the technical field of light-emitting diodes (LEDs), and in particular, to an LED control system.

BACKGROUND

At present, LEDs have been widely used in many fields such as furniture decoration, holiday scene beautification, and Christmas lamps. In order to enable the LEDs to achieve various lighting effects, it is necessary to control or adjust output grayscales of the lighting effects through an LED driving circuit, and a controller is required to send control data as needed. The controller is usually connected to an LED unit using four wires or three wires. Whether it is a four-wire system or a three-wire system, there is a dedicated data cable used by the controller to send data to the LED unit. According to the cost requirement of this field and a requirement adapting to some special application occasions, such as serial connection use, there is already an application scheme that uses two wires. In this scheme, it is also difficult to decode data, and it is required to decode valid data accurately from a power cable. These all make the design of this type of product complex, high in cost, and low in reliability.

SUMMARY

The present disclosure provides an LED control system, which solves the problems of complex structure and high cost of the LED control system in the related art.

According to one aspect of the present disclosure, an LED control system is provided, including:
  a controller and an LED light string electrically connected to the controller,
  wherein the controller includes a first data output port and a second data output port, and is configured to send a first data signal via the first data output port and send a second data signal via the second data output port; the first data signal and the second data signal have opposite phases; and
  the LED light string is capable of receiving the first data signal and the second data signal via a data receiving port, implementing display control of LEDs according to the first data signal and the second data signal, and supplying power to the LEDs by performing power conversion on the first data signal and the second data signal.

Further, the LED light string includes: N LED units connected in series; each LED unit includes a first data receiving port and a second data receiving port; the first data receiving port of the first LED unit is configured to receive the first data signal, and the second data receiving port of the Nth LED unit is configured to receive the second data signal; and the second data receiving port of the first LED unit is connected in series with the first data receiving port of the Nth LED unit, where N is a natural number greater than or equal to 1.

Further, each of the LED units includes a power conversion circuit, a data decoding circuit, a display control circuit, a driving control circuit, and an LED; two input ends of the power conversion circuit serve as the first data receiving port and the second data receiving port of the LED unit, respectively; an output end of the power conversion circuit is respectively connected to a power supplying end of the data decoding circuit and the power supplying end of the display control circuit; a data input end of the data decoding circuit is connected to the first data receiving port of the LED unit; a data output end of the data decoding circuit is connected to a data input end of the display control circuit; a data output end of the display control circuit is connected to a data input end of the driving control circuit; the driving control circuit is further connected to the first data receiving port and the second data receiving port of the LED unit, respectively; a data output end of the driving control circuit is connected to a negative electrode of the LED; a positive electrode of the LED is connected to the first data receiving port of the LED unit;
  the power conversion circuit is capable of converting the first data signal and the second data signal into a power supplying source;
  the data decoding circuit is capable of decoding the first data signal to obtain display control data;
  the display control circuit is configured to generate driving control data according to the display control data; and
  the driving control circuit is configured to generate a driving signal according to the driving control data, so that the LED is displayed according to the driving signal.

Further, the power conversion circuit includes a first diode, a second diode, a third diode, a fourth diode, and a first capacitor; a negative electrode of the first diode is connected to the first data receiving port of the LED unit, and a positive electrode of the first diode is connected to a positive electrode of the third diode; a negative electrode of the third diode is connected to the second data receiving port of the LED unit; a positive electrode of the second diode is connected to the first data receiving port of the LED unit; a negative electrode of the second diode is connected to a negative electrode of the fourth diode; a positive electrode of the fourth diode is connected to the second data receiving port of the LED unit; one end of the first capacitor is connected to the negative electrode of the second diode, and the other end of the first capacitor is connected to the positive electrode of the first diode; and one end of the first capacitor is a positive power end of the power conversion circuit, and the other end of the first capacitor is a negative grounding end of the power conversion circuit.

Further, the data decoding circuit includes an edge detection circuit, an oscillator, a counter, a comparator, and a shift register; an input end of the edge detection circuit is connected to the first data receiving end of the LED unit, and a data output end of the edge detection circuit is connected to the oscillator, the counter, and the shift register respectively; the counter is connected to the oscillator; the comparator is connected to the counter; and the shift register is connected to the comparator.

Further, the data decoding circuit includes an edge detection circuit, an oscillator, a counter, a comparator, a shift register, and a reference bit processing circuit; an input end of the edge detection circuit is connected to the first data receiving end of the LED unit; a data output end of the edge detection circuit is connected to the oscillator, the counter, the reference bit processing circuit, and the shift register, respectively; the counter is connected to the oscillator; the comparator is connected to the counter and the reference bit processing circuit respectively; and the shift register is connected to the comparator.

Further, the display control circuit includes a reset code detection circuit, a display data register, and an on/off control circuit; a data input end of the reset code detection circuit is connected to the first data receiving port of the LED unit; the display data register is connected to the reset code detection circuit; and the on/off control circuit is connected to the display data register.

Further, the controller includes a voltage reducing unit, a data sending main control unit, a first switch transistor, a second switch transistor, a third switch transistor, a fourth switch transistor, a fifth switch transistor, a sixth switch transistor, a first resistor, and a second resistor; an input end of the voltage reducing unit is connected to a power end; an output end of the voltage reducing unit is connected to the data sending main control unit;

an output end of the data sending main control unit is respectively connected to a control end of the first switch transistor and a control end of the second switch transistor; a first end of the first switch transistor is connected to the power end through the first resistor; a second end of the first switch transistor is connected to a signal ground; a first end of the second switch transistor is connected to the power end through the second resistor; a second end of the second switch transistor is connected to the signal ground;

a control end of the third switch transistor and a control end of the fourth switch transistor are both connected to the first end of the first switch transistor; a first end of the third switch transistor is connected to the power end; a second end of the third switch transistor is connected to a first end of the fourth switch transistor and serves as the first data output port of the controller; a second end of the fourth switch transistor is connected to the signal ground;

a control end of the fifth switch transistor and a control end of the sixth switch transistor are both connected to the first end of the first switch transistor; a first end of the fifth switch transistor is connected to the power end; a second end of the fifth switch transistor is connected to a first end of the sixth switch transistor and serves as the second data output port of the controller; and a second end of the sixth switch transistor is connected to the signal ground.

Further, the data sending main control unit includes a single-chip microcomputer.

Further, the first switch transistor, the second switch transistor, the fourth switch transistor, and the sixth switch transistor each include an N-type metal oxide semiconductor (MOS) transistor; and the third switch transistor and the fifth switch transistor each include a P-type MOS transistor.

The LED control system provided by the present disclosure is composed of the controller and the LED light string. The controller can send data in the form of an ordinary data signal, and the LED light string can receive data in the form of a data signal. Operations such as data classification are not required for both the controller that sends data and the LED light string that receives data. The LED control system is simple in implementation, low in cost, and high in reliability.

BRIEF DESCRIPTION OF THE DRAWINGS

The accompanying drawings are used to provide a further understanding of the present disclosure, and constitute a part of the specification. They are used to explain the present disclosure together with the following specific implementation modes, but do not constitute a limitation to the present disclosure.

DETAILED DESCRIPTION OF THE EMBODIMENTS

It should be noted that the embodiments in the present disclosure and features in the embodiments may be combined with each other without conflicts. The present disclosure will be described in detail below with reference to the accompanying drawings and in combination with embodiments.

In order to make those skilled in the art better understand the solutions of the present disclosure, the technical solutions in the embodiments of the present disclosure will be described clearly and completely below in combination with the drawings in the embodiments of the present disclosure. Obviously, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

It should be noted that the terms "first", "second", etc. in the specification and claims of the present disclosure and the above drawings are used to distinguish similar objects, and do not have to be used to describe a specific order or sequence. It should be understood that the data used in this way can be interchanged under appropriate circumstances for the purposes of the embodiments of the present disclosure described herein. In addition, the terms "include" and "have" as well as any of their variations are intended to cover non-exclusive inclusions. For example, processes, methods, systems, products, or devices that include a series of steps or units are not necessarily limited to those steps or units clearly listed below, but may include other steps or units that are not clearly listed or are inherent to these processes, methods, products, or devices.

Figure 1:
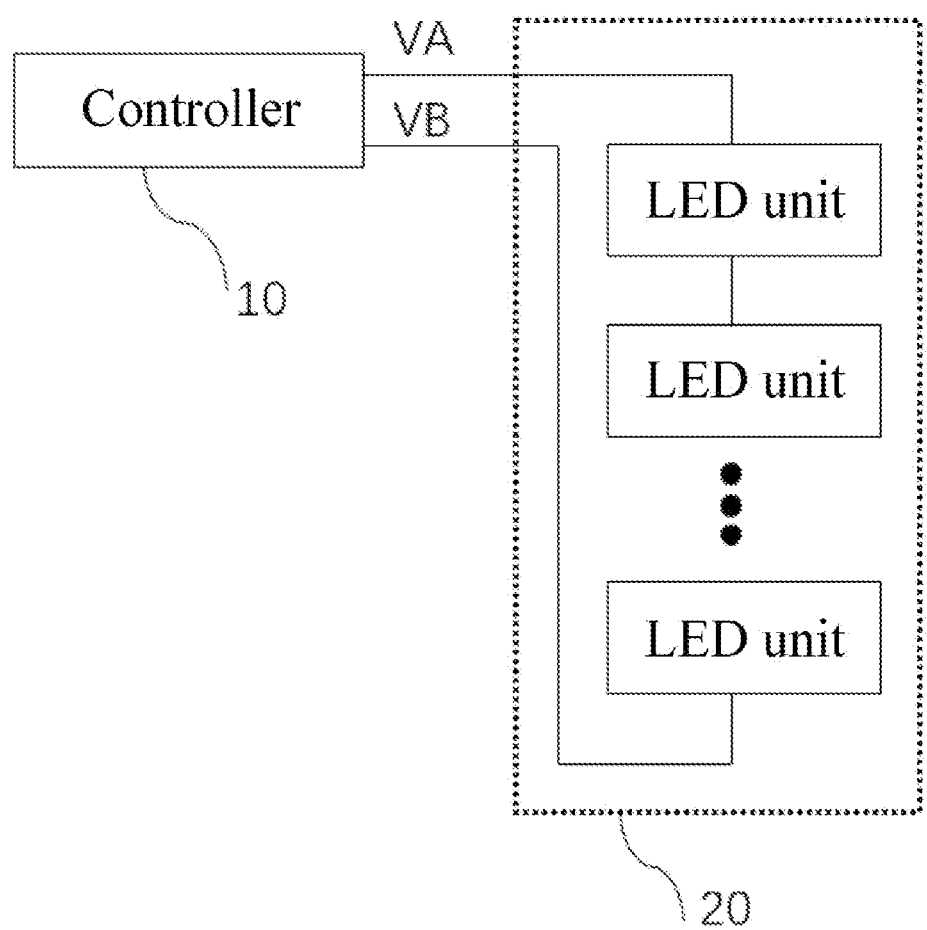
FIG. 1 is a structural block diagram of an LED control system according to the present disclosure.

This embodiment provides an LED control system. FIG. 1 is a structural block diagram of an LED control system according to an embodiment of the present disclosure. As shown in FIG. 1, the LED control system includes:

a controller 10 and an LED light string 20 electrically connected to the controller 10.

The controller 10 includes a first data output port VA and a second data output port VB, and is configured to send a first data signal via the first data output port VA and send a second data signal via the second data output port VB. The first data signal and the second data signal have opposite phases.

The LED light string 20 can receive the first data signal and the second data signal via a data receiving port, implement display control of LEDs according to the first data signal and the second data signal, and supply power to the LEDs by performing power conversion on the first data signal and the second data signal.

The LED control system provided by the present disclosure is composed of the controller and the LED light string. The controller can send data in the form of an ordinary data signal, and the LED light string can receive data in the form of a data signal. Operations such as data classification are not required for both the controller that sends data and the LED light string that receives data. The LED control system is simple in implementation, low in cost, and high in reliability.

Specifically, the LED light string 20 includes: N serially connected LED units; each LED unit includes a first data receiving port and a second data receiving port; the first data receiving port of the first LED unit is configured to receive the first data signal, and the second data receiving port of the Nth LED unit is configured to receive the second data signal; and the second data receiving port of the first LED unit is connected in series with the first data receiving port of the Nth LED unit, where N is a natural number greater than or equal to 1.

It should be noted that the LED light string is composed of a plurality of LED units connected in series. It is necessary to ensure that a total current of working of the LED units is continuously stable, and a current/voltage characteristic curve of all the serially connected LED units should be consistent as much as possible.

In the embodiments of the present disclosure, the controller 10 is connected to the LED light string 20 through two wires VA and VB, and the controller 20 sends data and provides power to the LED light string 20 through VA and VB. The LED light string 20 is composed of one or more LED units connected in series. Each LED unit is provided with two leading-out ends VA and VB. VA and VB are power input ports of the LED unit. The VA is also a data input port. The LED unit receives data from the controller through VA and is configured to control on, off, a magnitude of an output current, and the like of LEDs. The LED light string 20 can be one LED unit or can be composed of a plurality of LED units connected in series. As shown in FIG. 1, the plurality of LED units are connected in series, a connection way of which is as follows: The VA end of the first LED unit is connected to the VA end of the controller, and the VB end of the first LED unit is connected to the VA end of the second LED unit; the VB end of the second LED unit is connected to the VA end of the third LED unit, and so on; and the VB end of the last LED unit is connected to the VB end of the controller. During use, the output ends VA and VB of the controller 10 should be able to provide a sufficient voltage to ensure a voltage drop of 4 V to 5 V on each LED unit.

Figure 3:
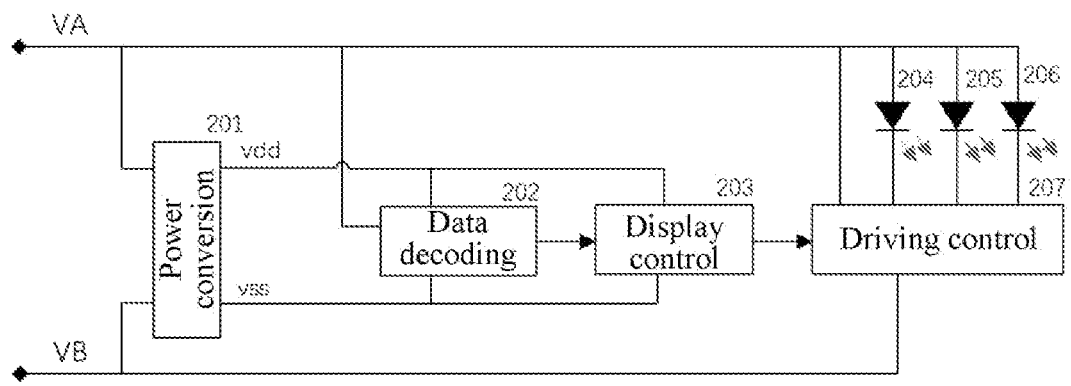
FIG. 3 is a block diagram of a circuit structure of an LED unit according to the present disclosure.

It should be noted that in the embodiments of the present disclosure, the LED light string in the LED control system can be specifically composed of five LED units connected in series, and each LED unit is provided with two data ports VA and VB. The LED units are shown in FIG. 3. The series connection way of the five LED units is as follows: The VA end of a first LED unit is connected to the VA end of the controller; the VB end of the first LED unit is connected to VA of the second LED unit; and VB of a second LED unit is connected to VA of a third LED unit. In this way, the five LED units are connected in series, and the VB end of a fifth LED unit is connected to the VB end of the controller. The system uses a 24V power source, and output voltages of the output ports VA and VB of the controller are also 24 V. An average voltage difference on each LED unit is 4.8 V.

Figure 2:
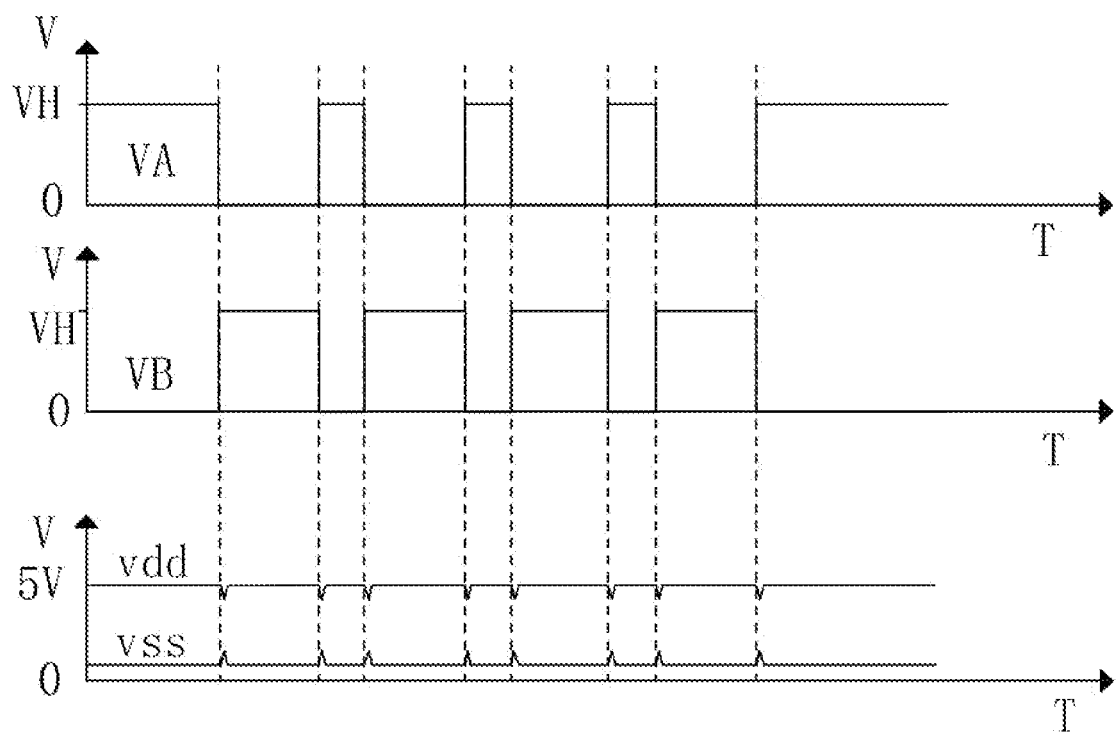
FIG. 2 is a schematic diagram of a data sending waveform and a waveform of internal power of an LED unit according to the present disclosure.

The controller 10 provides power and sends data to the LED light string 20 through the VA and VB ends. As shown in FIG. 2, waveforms of VA and VB in the figure are as shown in the schematic diagram during data sending. During the data sending, an output of VA only has two states, namely, a high level or a low level, which is referred to as sending in the form of a digital signal. After the data sending is completed, VA remains at a high level. An output of VB only needs to be inverted with that of VA in real time.

In the embodiments of the present disclosure, only one specific data transmission protocol needs to be defined. The controller 10 sends data according to this data protocol, and the LED unit receives data according to this data protocol, thereby simplifying the implementation of the controller and an LED unit circuit.

Figure 6:
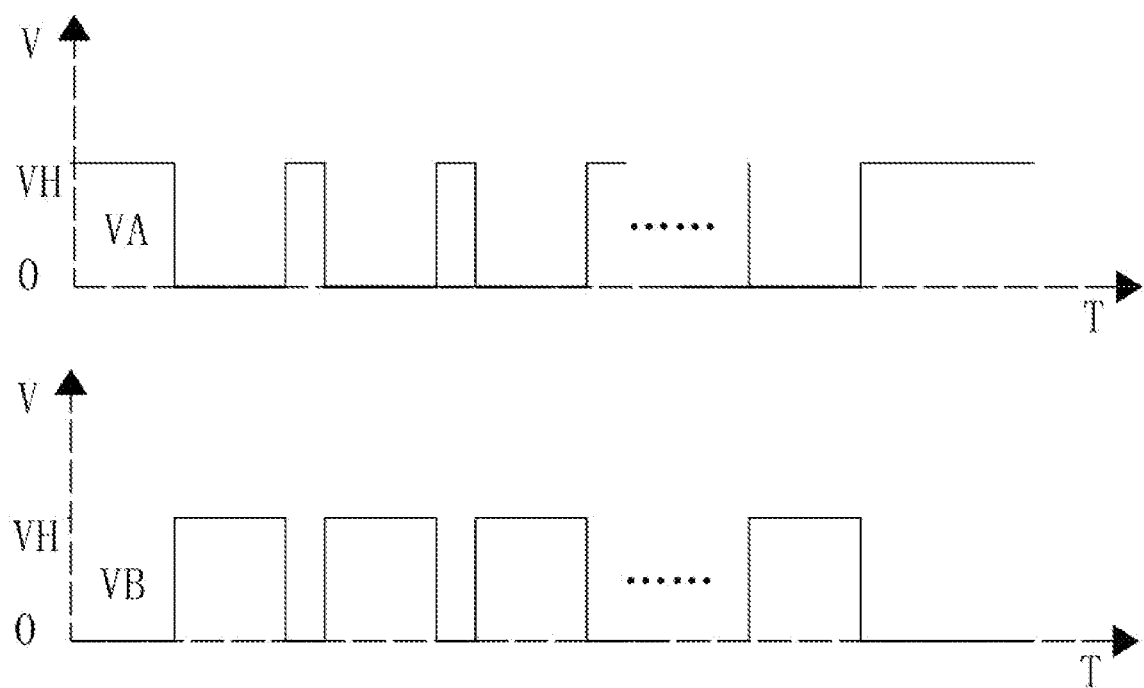
FIG. 6 is a schematic waveform diagram of a data transmission protocol according to the present disclosure.

The data protocol used in the embodiments of the present disclosure is as shown in FIG. 6. VA and VB which are driven by the controller 10 can complete tasks of sending data and supplying power to the LED units. The biggest advantage is that there are no special requirements for VA and VB during data sending. As shown in FIG. 6, VA only needs to be switched between a high level VH and a low level 0 V to complete a data sending task, which is exactly the same as ordinary digital signal transmission, and so is VB, but VB and VA needs to be inverted. After the data sending is completed, if VA remains at the high level VH, and VB remains at the low level 0 V, a power supplying state is achieved to supply power to the LED units. This data protocol has almost no requirements for the controller 10, so that the data protocol is easy to complete and highly reliable.

A decoding circuit of a corresponding LED unit can complete a decoding task by processing an input VA data signal according to a digital signal, which is extremely simple and reliable. Compared to existing similar schemes, in the data protocol adopted by the present disclosure, in both cases of sending data to the LED units and supplying power to the LED units, the controller only needs to send the high level VH or the low level 0 V, and does not need to send an intermediate level. It is very easy for the controller to achieve such an output signal, and the reliability of the output signal can be ensured. Even if the plurality of LED units are driven by the same controller, it is also very easy to decode the corresponding LED units.

Therefore, in the LED control system provided by the present disclosure, it is simple and feasible for the controller to send data and supply power to the LED units according to the waveform as shown in FIG. 6, and the corresponding LED units also easily decode data from VA.

In practical applications, a data transmission protocol is formulated, and the controller sends data according to requirements of the data protocol. The LED units can achieve stable and reliable operation of a two-wire LED control system due to the adoption of the above-mentioned power supplying module and data decoding circuit.

Specifically, each of the LED units includes a power conversion circuit 201, a data decoding circuit 202, a display control circuit 203, a driving control circuit 207, and an LED. Two input ends of the power conversion circuit 201 serve as the first data receiving port VA and the second data receiving port VB of the LED unit, respectively. An output end of the power conversion circuit 201 is respectively connected to a power supplying end of the data decoding circuit 202 and the power supplying end of the display control circuit 203. A data input end of the data decoding circuit 202 is connected to the first data receiving port VA of the LED unit. A data output end of the data decoding circuit 202 is connected to a data input end of the display control circuit 203. A data output end of the display control circuit 203 is connected to a data input end of the driving control circuit 207. The driving control circuit 207 is further connected to the first data receiving port VA and the second data receiving port VB of the LED unit, respectively. A data output end of the driving control circuit 207 is connected to a negative electrode of the LED; and a positive electrode of the LED is connected to the first data receiving port of the LED unit.

The power conversion circuit 201 can convert the first data signal and the second data signal into a power supplying source.

The data decoding circuit 202 can decode the first data signal to obtain display control data.

The display control circuit 203 is configured to generate driving control data according to the display control data.

The driving control circuit 207 is configured to generate a driving signal according to the driving control data, so that the LED is displayed according to the driving signal.

It should be noted that each LED unit is provided with two ports VA and VB. VA and VB are power input ends or data input ends. One of VA and VB (such as VA) is used as a data port. From the above description, it can be seen that during data transmission, VA and VB from the controller 10 cannot continuously and stably provide power to each LED unit. Therefore, the LED unit needs to be provided with a power conversion circuit 201. In the data transmission stage, VA will be switched between the high level VH and the low level 0 V, and VA and VB are also power supplying ends of the LED unit. In order to ensure that the LED unit can work normally and perform decoding smoothly when VA becomes 0 V, special processing needs to be performed on a power supplying system of the LED driving circuit in the LED unit. This is implemented by the power conversion circuit 201. The power conversion circuit 201 is configured to obtain stable internal power from the VA and VB ends for stable operation of other circuits. The stable power obtained by processing performed by the power conversion circuit is as shown in vdd and vss waveforms in FIG. 2, where vdd is the power, and vss is the ground. The LED unit should also include the data decoding circuit 202 configured to obtain control data from the VA end. As VA is an ordinary digital signal for the decoding circuit, so VA only needs to be decoded according to an agreed data protocol. The LED unit should also include the display control circuit 203. This circuit is configured to control on, off, a magnitude of a current, or the like of the LED according to the data obtained by the above data decoding circuit. According to an actual need, the LED unit can also include more other functions, which are not limited here.

It should also be noted that in the embodiments of the present disclosure, as shown in FIG. 3, the LED can include an LED 204, an LED 205, and an LED 206. Specifically, the LED can also include other quantities of LEDs, which is only an example and will not be limited.

Figure 4:
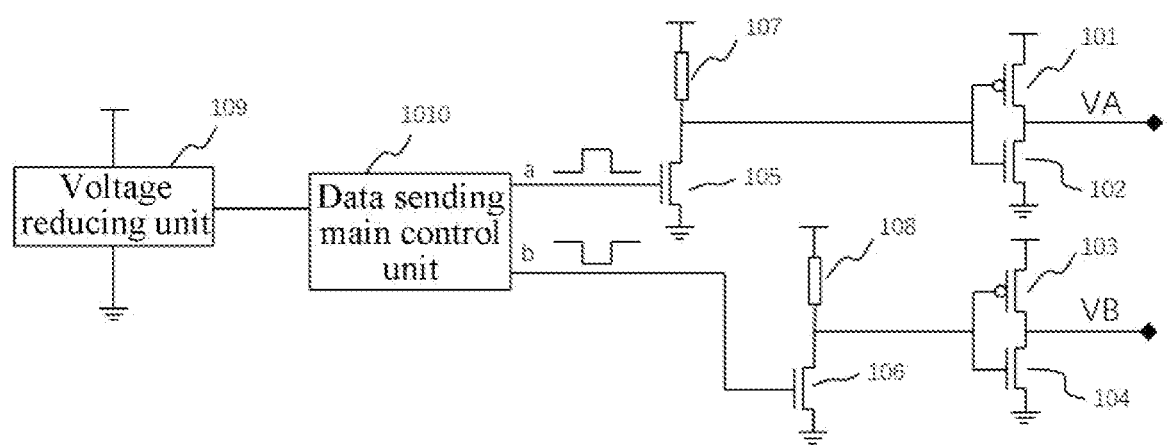
FIG. 4 is a schematic diagram of a specific implementation circuit of a controller according to the present disclosure.

As a specific implementation of the controller 10, as shown in FIG. 4, the controller 10 includes a voltage reducing unit 109, a data sending main control unit 1010, a first switch transistor 105, a second switch transistor 106, a third switch transistor 101, a fourth switch transistor 102, a fifth switch transistor 103, a sixth switch transistor 104, a first resistor 107, and a second resistor 108. An input end of the voltage reducing unit 109 is connected to a power end, and an output end of the voltage reducing unit 109 is connected to the data sending main control unit 1010.

An output end of the data sending main control unit 1010 is respectively connected to a control end of the first switch transistor 105 and a control end of the second switch transistor 106. A first end of the first switch transistor 105 is connected to the power end through the first resistor 107. A second end of the first switch transistor 105 is connected to a signal ground. A first end of the second switch transistor 106 is connected to the power end through the second resistor 108. A second end of the second switch transistor 106 is connected to the signal ground.

A control end of the third switch transistor 101 and a control end of the fourth switch transistor 102 are both connected to the first end of the first switch transistor 105. A first end of the third switch transistor 101 is connected to the power end. A second end of the third switch transistor 101 is connected to a first end of the fourth switch transistor 102 and serves as the first data output port VA of the controller. A second end of the fourth switch transistor 102 is connected to the signal ground.

A control end of the fifth switch transistor 103 and a control end of the sixth switch transistor 104 are both connected to the first end of the first switch transistor 106. A first end of the fifth switch transistor 103 is connected to the power end. A second end of the fifth switch transistor 103 is connected to a first end of the sixth switch transistor 104 and serves as the second data output port VB of the controller. A second end of the sixth switch transistor 104 is connected to the signal ground.

Preferably, the data sending main control unit 1010 includes a single-chip microcomputer.

Preferably, the first switch transistor 105, the second switch transistor 106, the fourth switch transistor 102, and the sixth switch transistor 104 each include an N-type MOS transistor. The third switch transistor 101 and the fifth switch transistor 103 each include a P-type MOS transistor.

The controller 10 provides power and sends data to the LED light string 20 through the VA and VB ports. The schematic diagram of the controller 10 is as shown in FIG. 4, including a voltage reducing unit 109, a data sending main control unit 1010, PMOS transistors 101 and 103, NMOS transistors 102, 104, 105, and 106, and resistors 107 and 108. The voltage reducing unit 109 can process and obtain power that meets a usage requirement of the data sending main control unit. A working voltage of the data sending main control unit 1010 is generally 3 V to 5 V. As the system uses 24V power, the voltage reducing unit needs to generate 5V low-voltage power and provide the power to the data sending main control unit 1010 for use. The data configured to control the LED light string 20 is sent through the data sending main control unit 1010. The data controlling the LED light string 20 is stored in the data sending main control unit. When the system is powered on and operates normally, these data will be output according to designed process requirements.

In the embodiments of the present disclosure, the data of the data sending main control unit 1010 is output in the form of signals a and b. Signal a and signal b are always inverted. During data sending, signal a is sent as data. After the sending is completed, signal a remains at a high level. The data sending main control unit 1010 can be a data processing module with a single-chip microcomputer serving as a core, or can be designed in other forms, as long as it can send signals a and b according to the above requirements, where a and b are signals with low voltages and low driving forces, which cannot be directly used. Signals a and b need to be amplified and processed into VA and VB for use. Descriptions are made by taking a as an example. Signal a is connected to a gate of the NMOS transistor 105. A drain of the NMOS transistor 105 is connected to a gate of the PMOS transistor 101, a gate of the NMOS transistor 102, and one end of the resistor 107, and the other end of the resistor 107 is connected to a power source of the system. A source of the PMOS transistor 101 is connected to the power source of the system, and a drain is connected to a drain of the NMOS transistor 102 and serves as the output end VA of the controller. A source of the NMOS transistor 102 is connected to a system ground. It can be seen that an output amplitude of VA obtained by amplifying signal a is the same as the power source of the system. By the adoption of the PMOS transistor 101 and the NMOS transistor 102, VA can be caused to have a desired driving force, so that VA can be used as both a signal end to send data and a power end to supply power to the LED light string. Referring to FIG. 4, signal b is processed in the same way to obtain VB. The waveforms of VA and VB in FIG. 2 are shown in the schematic diagram of the data sent by the controller.

In the embodiments of the present disclosure, the voltage reducing unit 109 can specifically be a circuit capable of achieving voltage reduction, which is well known to those skilled in the art and will not be further described here.

Figure 5:
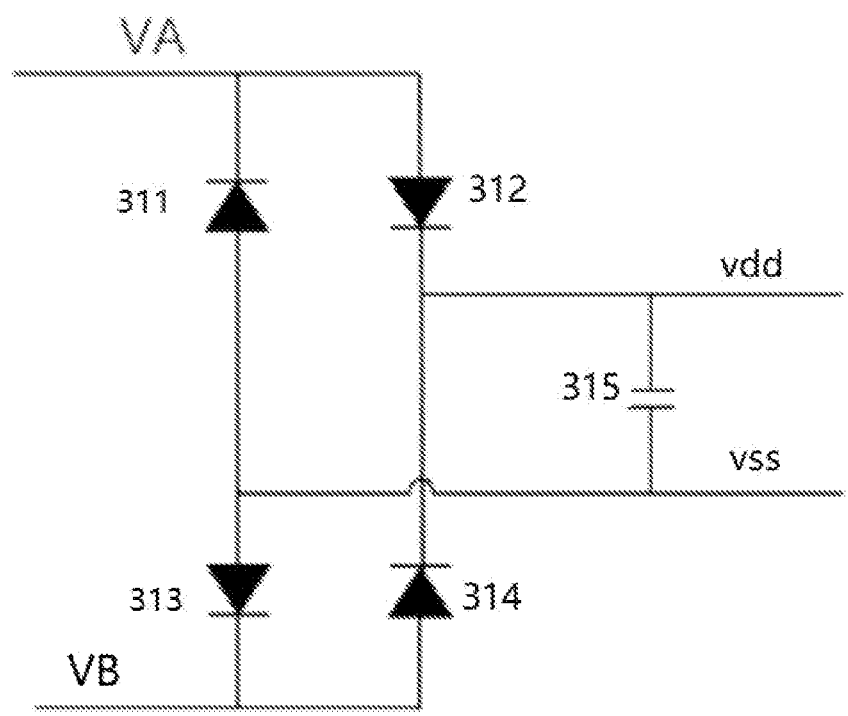
FIG. 5 is a schematic circuit diagram of a power conversion circuit according to the present disclosure.

As a specific implementation of the power conversion circuit 201, as shown in FIG. 5, the power conversion circuit 201 includes a first diode 311, a second diode 312, a third diode 313, a fourth diode 314, and a first capacitor 315. A negative electrode of the first diode 311 is connected to the first data receiving port VA of the LED unit, and a positive electrode of the first diode 311 is connected to a positive electrode of the third diode 313. A negative electrode of the third diode 313 is connected to the second data receiving port VB of the LED unit. A positive electrode of the second diode 312 is connected to the first data receiving port VA of the LED unit. A negative electrode of the second diode 312 is connected to a negative electrode of the fourth diode 314. A positive electrode of the fourth diode 314 is connected to the second data receiving port VB of the LED unit. One end of the first capacitor 315 is connected to the negative electrode of the second diode 312, and the other end of the first capacitor 315 is connected to the positive electrode of the first diode 311. One end of the first capacitor 315 is a positive power end vdd of the power conversion circuit, and the other end of the first capacitor 315 is a negative grounding end vss of the power conversion circuit.

It should be understood that VA and VB are input ends of the power conversion circuit 201, and outputs vdd and vss respectively serve as a power source and the ground to supply power to other circuits in the LED unit. The diodes in the power conversion circuit can also be replaced by MOS transistor equivalent structures, and the diodes used here are to more intuitively demonstrate their working principles. The most important characteristic of this circuit structure is that one of VA and VB having a high voltage is selected as a driving end of the internal power source vdd, and the other one of VA and VB having a low voltage is correspondingly selected as a driving end of the internal ground vss. According to the previous descriptions, it can be seen that VB and VA are inverted. During the data sending, when VA is at a low level of 0 V, VB is at a high level. In this case, the fourth diode 314 is in an on state. VB ensures the power supplying capacity of the internal power source vdd through the fourth diode 314. The corresponding first diode 311 is also in an on state. VA ensures the power supplying capacity of the internal ground vss through the first diode 311. When VA returns to a high level, VB returns to a low level. In this case, the diodes 314 and 311 are in off states, while the diodes 312 and 313 are in on states. VA supplies power to the internal power source vdd through the second diode 312, and VB supplies power to the internal ground vss through the third diode 313. FIG. 2 shows the schematic diagram of vdd and vss which are output by the power conversion circuit. It can be seen that the power vdd and the power vss which are output by the power conversion circuit 201 are not affected by state flipping of the input ends VA and VB, and can provide continuous and stable working power for other circuits in the LED unit.

Figure 7:
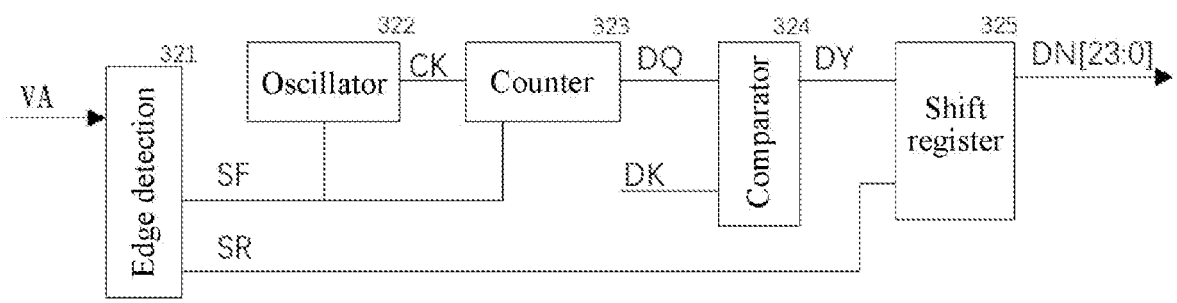
FIG. 7 is a schematic diagram of a circuit structure of a specific implementation of a data decoding circuit according to the present disclosure.

As one specific implementation of the data decoding circuit 202, as shown in FIG. 7, the data decoding circuit 202 includes an edge detection circuit 321, an oscillator 322, a counter 323, a comparator 324, and a shift register 325. An input end of the edge detection circuit 321 is connected to the first data receiving end VA of the LED unit, and a data output end of the edge detection circuit 321 is connected to the oscillator 322, the counter 323, and the shift register 324 respectively. The counter 323 is connected to the oscillator 322. The comparator 324 is connected to the counter 323. The shift register 325 is connected to the comparator 324.

Figure 8:
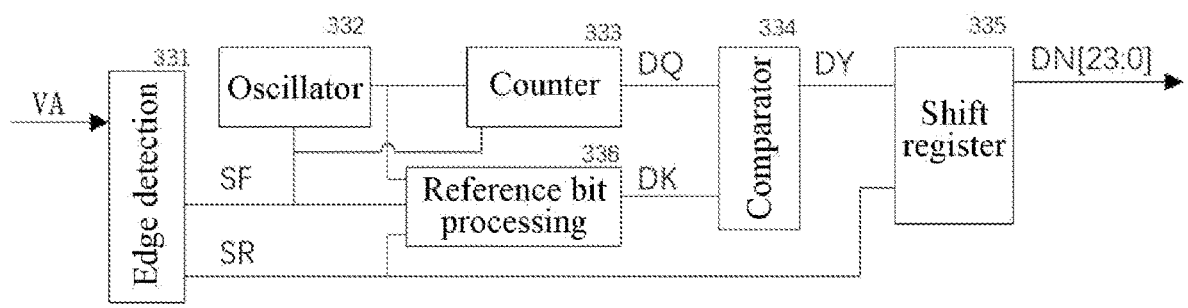
FIG. 8 is a schematic diagram of a circuit structure of another specific implementation of a data decoding circuit according to the present disclosure.

As another specific implementation of the data decoding circuit 202, as shown in FIG. 8, the data decoding circuit 202 includes an edge detection circuit 331, an oscillator 332, a counter 333, a comparator 334, a shift register 335, and a reference bit processing circuit 336. An input end of the edge detection circuit 331 is connected to the first data receiving end VA of the LED unit. A data output end of the edge detection circuit 331 is connected to the oscillator 332, the counter 333, the reference bit processing circuit 336, and the shift register 335 respectively. The counter 333 is connected to the oscillator 332. The comparator 334 is connected to the counter 333 and the reference bit processing circuit 336 respectively. The shift register 335 is connected to the comparator 334.

Figure 9:
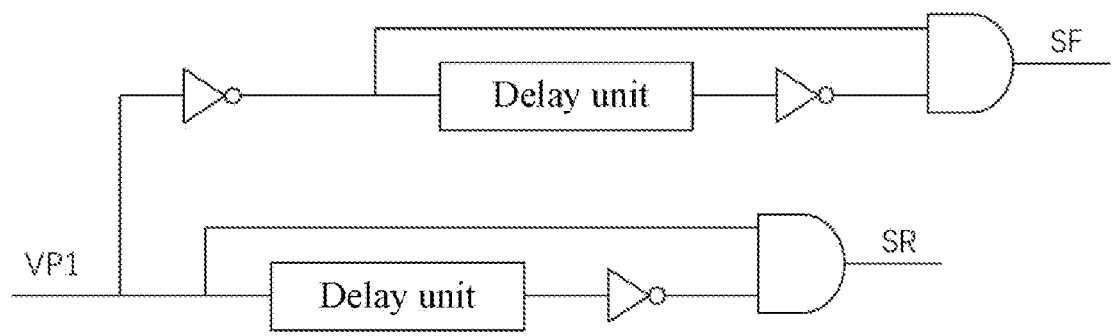
FIG. 9 is a schematic circuit diagram of an edge detection circuit according to the present disclosure.

FIG. 9 shows a specific working principle diagram of the edge detection circuit 321 and the edge detection circuit 331.

Figure 10:
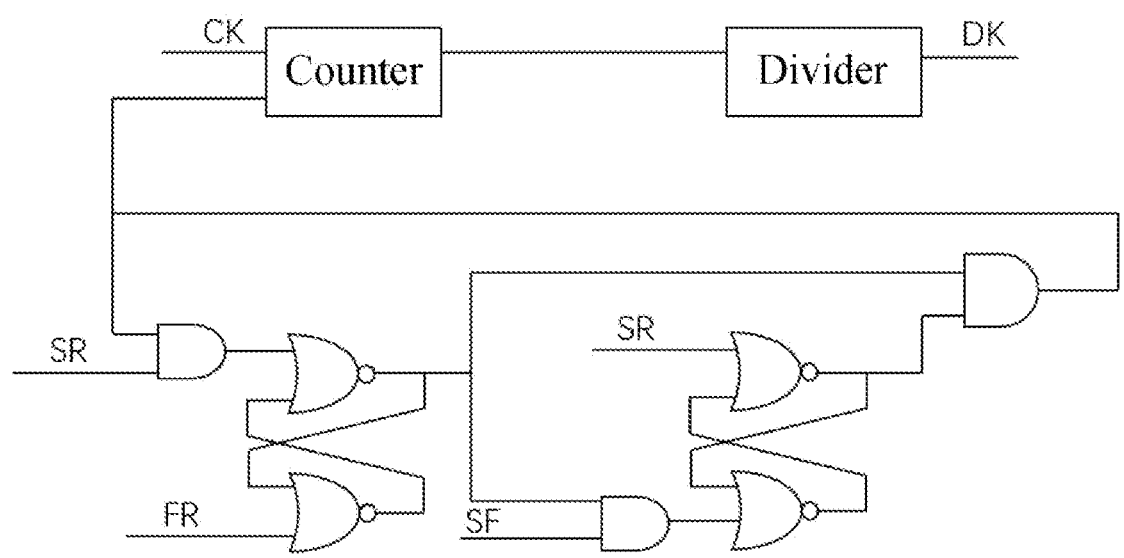
FIG. 10 is a schematic circuit diagram of a reference bit processing circuit according to the present disclosure.

FIG. 10 shows a specific working principle diagram of the reference bit processing circuit 336.

Figure 11:
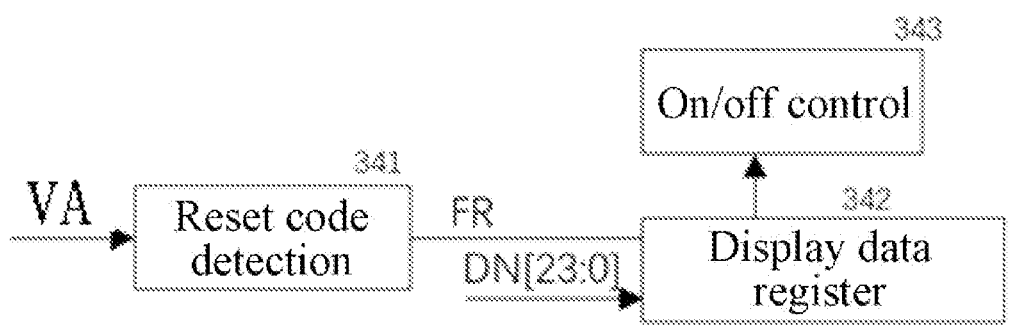
FIG. 11 is a schematic circuit diagram of a display control circuit according to the present disclosure.

Specifically, as shown in FIG. 11, the display control circuit includes a reset code detection circuit 341, a display data register 342, and an on/off control circuit 343. A data input end of the reset code detection circuit 341 is connected to the first data receiving port VA of the LED unit. The display data register 342 is connected to the reset code detection circuit 341. The on/off control circuit 343 is connected to the display data register 342.

Figure 12:
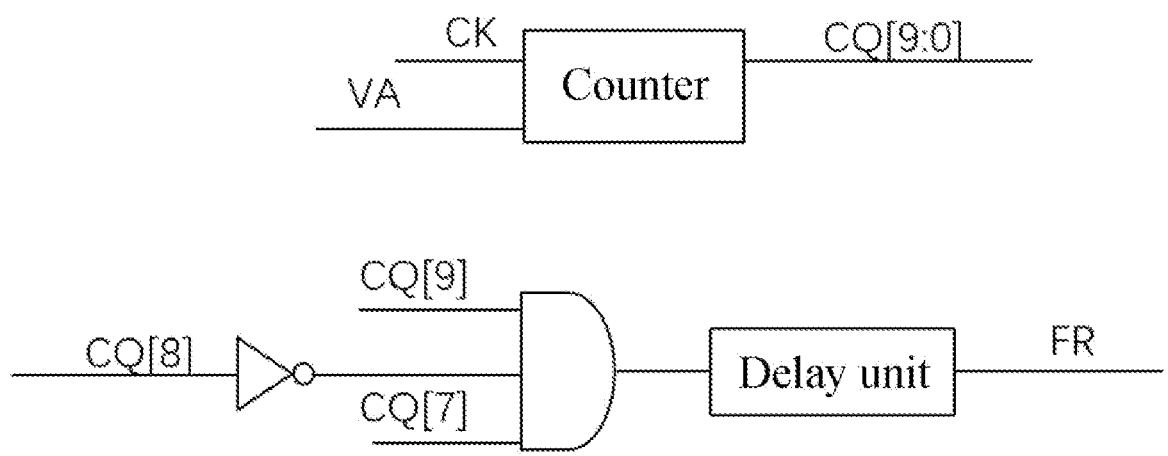
FIG. 12 is a schematic circuit diagram of a reset code detection circuit according to the present disclosure.

In the embodiments of the present disclosure, as a specific implementation of the reset code detection circuit 341, FIG. 12 shows a working principle diagram of the reset code detection circuit 341.

Figure 13:
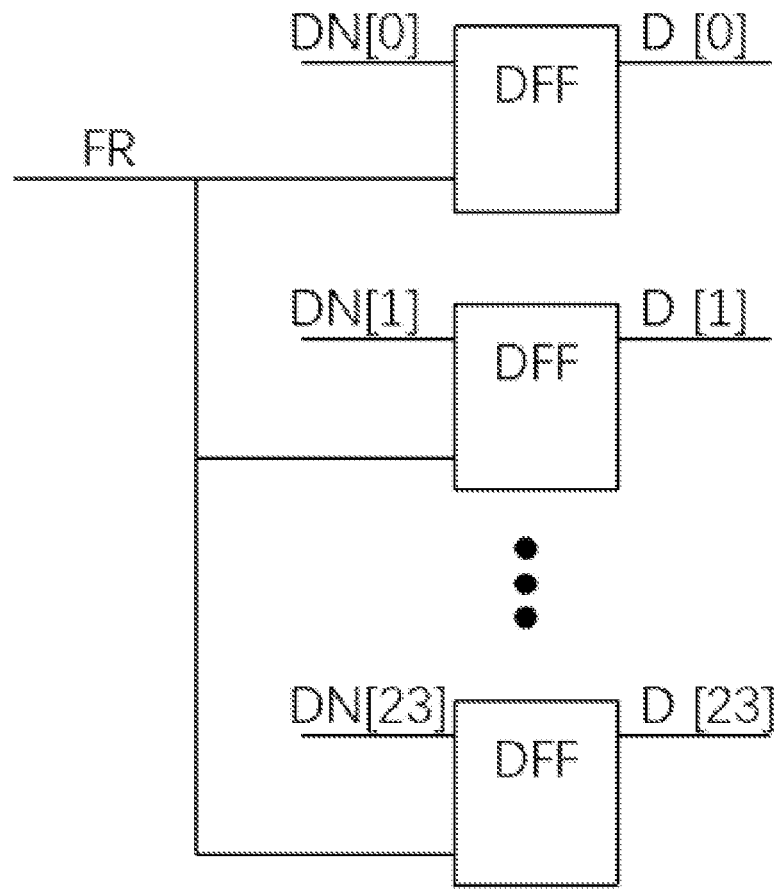
FIG. 13 is a schematic circuit diagram of a display data register according to the present disclosure.

As a specific implementation of the display data register 342, FIG. 13 shows a working principle diagram of the display data register 342.

Figure 14:
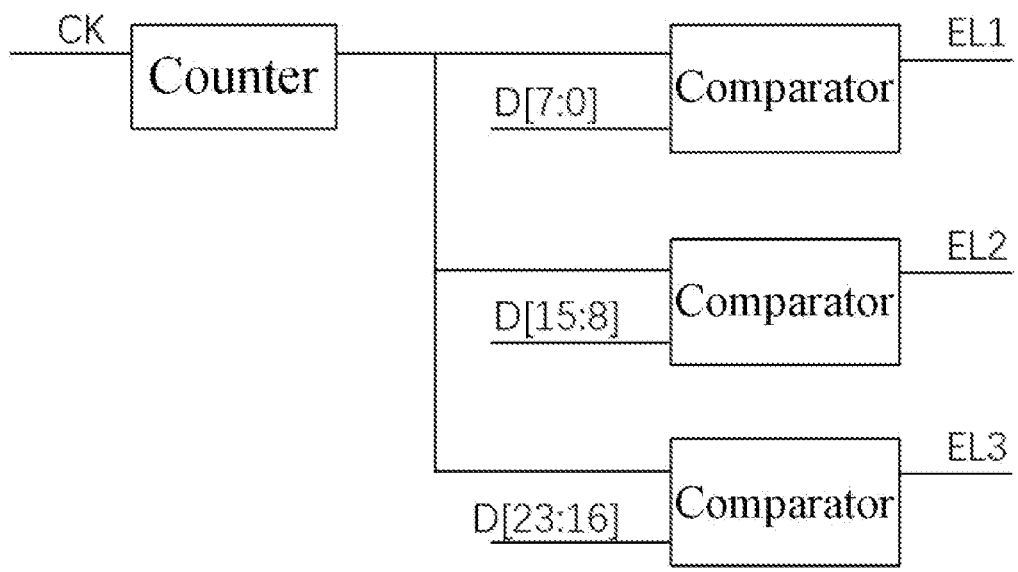
FIG. 14 is a schematic circuit diagram of an on/off control circuit according to the present disclosure.

As a specific implementation of the on/off control circuit 343, FIG. 14 shows a working principle diagram of the on/off control circuit 343.

Specific working processes of the data decoding circuit, the display control circuit, and the driving control circuit provided by the embodiments of the present disclosure will be described in detail in conjunction with FIG. 15 to FIG. 18.

Figure 15:
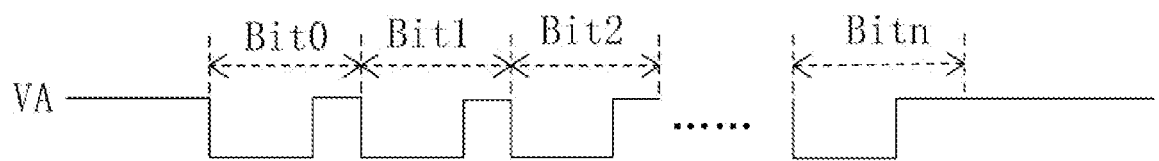
FIG. 15 is a schematic waveform diagram of data sent by VA according to the present disclosure.

VA is used as a data transmission line. It is defined that starting from a falling edge of VA, a bit of data returns to a high level after remaining at a low level for a certain duration, and then remains at the high level for a certain duration. Data 1 and data 0 are determined according to a low-level duration. For example, it can be defined that a bit of data with a low-level duration of 2 us is 0, and a bit of data with a low-level duration of 4 us is 1. The data bits need to be sent continuously, and VA remains at a high level after all the data bits are sent. It is defined that a reset code is generated if a high-level duration of VA exceeds a certain value. For example, it is defined that a reset code is generated if the high-level duration of VA is 100 us. A reset code makes received data valid. A waveform of data sent by VA is as shown in FIG. 15.

How many bits of data need to be sent in total is determined according to an actual functional requirement of a product. For example, in this embodiment, as three LED outputs need to be controlled, and eight bits of data are required to control an output grayscale of each LED, a total of 24 bits of data are required. After all pieces of data are sent, VA remains at a high level. When the high-level duration of VA exceeds 100 us, a reset code can be generated to cause the received data to be valid.

The data decoding circuit completes decoding of the data from VA. As shown in FIG. 7, the data decoding circuit includes the edge detection circuit, the oscillator, the counter, the comparator, and the shift register. The so-called data decoding is a process of obtaining desired data from VA and storing it for backup use according to a definition of a data protocol. According to the definition of the data protocol, it is possible to determine whether a data bit is 1 or 0 by determining a length of the low-level duration of VA. Each determined bit of data is stored into the shift register to complete the data decoding task. There are various methods that can achieve the decoding, and the data decoding circuit described in the present disclosure is only one solution, not the only one.

Figure 16:
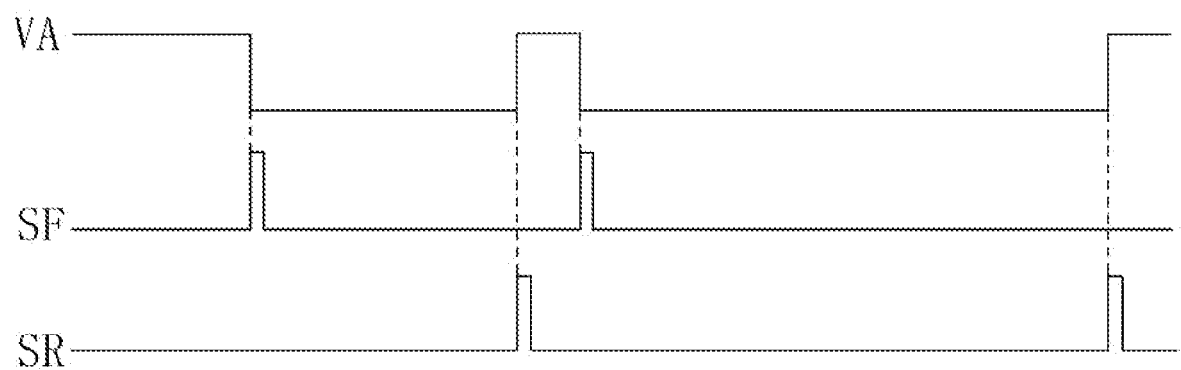
FIG. 16 is a schematic timing waveform diagram in a decoding process according to the present disclosure.

The specific decoding process is as follows: The edge detection circuit detects changes in a VA signal in real time, and generates pulse signals SF and SR at the falling edge and the rising edge of VA for backup use, respectively. FIG. 16 shows a timing waveform of the signal. SF triggers the oscillator 322 to operate and output an accurate clock signal CK. A cycle of CK is designed to be 150 ns. At the same time, the counter 323 starts counting from 0 by taking the signal CK as a clock under the action of SF, and a result DQ is output to a positive input end of the comparator 324. A negative input end of the comparator 324 is connected to data DK, and a value of DK is directly designed to be 20. SR is responsible for storing a result DY of the comparator as data into the shift register 325. From the above descriptions, it can be seen that if a low-level duration of a bit of data exceeds 3 us, the bit of data is determined as 1, and if a low-level duration of a bit of data is less than 3 us, the bit of data is determined as 0. At the rising edge of VA, the bit of data is stored into the shift register. The controller may send 24 bits of data which are divided into 3 groups, each group including 8 bits of data to control one LED. The shift register here is designed to be 24 bits. In the decoding process, the 24 bits of data will be stored into the shift register in sequence. After the sending of the 24 bits of data is completed, VA remains at a high level until next sending of new data.

The above describes the data protocol for sending data at a fixed rate and the corresponding decoding process. A data protocol with an adaptive data sending rate can also be defined, and the corresponding data decoding circuit only needs to be slightly modified on the basis of the decoding circuit mentioned above. The following introduces a control scheme for rate-adaptive transmission.

Figure 17:
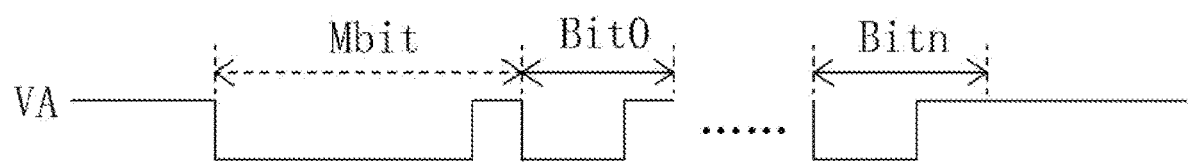
FIG. 17 is a schematic waveform diagram of a rate-adaptive data transmission protocol according to the present disclosure.

The data protocol with an adaptive rate is basically the same as the data protocol with a fixed rate, except that a reference bit Mbit is sent before data sending, and then all pieces of data are sent in sequence. FIG. 17 shows a schematic waveform diagram of a rate-adaptive data transmission protocol. The so-called rate adaptation refers to the fact that a length of data bits does not need to be fixed, but only needs to be proportional to the reference bit Mbit. For example, it is defined as follows: A low-level duration of data 0 is 2*T; a low-level duration of data 1 is 4*T; and a low-level duration of the reference bit Mbit is 3K*T. T is a unit of time length, and K is an integer. During application, the controller can the reference bit and the data bits according to the above proportional relationship according to an actual need, without fixing the length of the data bits. This scheme adopted greatly improves the adaptability and usage flexibility of this type of product.

For the above rate-adaptive data transmission protocol, the data decoding circuit, as shown in FIG. 8, includes the edge detection circuit 331, the oscillator 332, the counter 333, the comparator 334, the shift register 335, and the reference bit processing circuit 336. A decoding process of a frame of data is as follows: Firstly, the reference bit processing circuit calculates a low-level duration of the reference bit in conjunction with the edge detection circuit and the oscillator. After a rising edge of the reference bit, the result DK obtained by dividing this value by K is used as data of the negative input end of the comparator. Afterwards, each bit of data is decoded. Specifically, a low-level duration of each bit of data is calculated and locked as DQ on its rising edge, and this duration value DQ is connected to the positive input end of the comparator. The result DY of the comparator is a value, obtained by decoding, of a current bit of data. The result is stored into the shift register at the rising edge of each bit of data. This is completed by signal SR. The above describes the decoding process of rate-adaptive data transmission protocol.

After the data decoding circuit decodes the data from VA, the data will be provided to the display control circuit for use. The following introduces a working process of the display control circuit.

The display control circuit is responsible for obtaining data from the decoding circuit and controlling on/off states of three LEDs through the data. The display control circuit, as shown in FIG. 11, includes the reset code detection circuit 341, the display data register 342, and the on/off control circuit 343. When detecting that the high-level duration of VA exceeds 100 us, the reset code detection circuit generates a reset signal FR. FR loads data DN [23:0] in the data decoding circuit into the display data register. The on/off control circuit generates an LED on/off control signal according to display data. The driving circuit is responsible for turning on and turning off the LEDs and controlling a magnitude of specific current when the LEDs are turned on.

Figure 18:
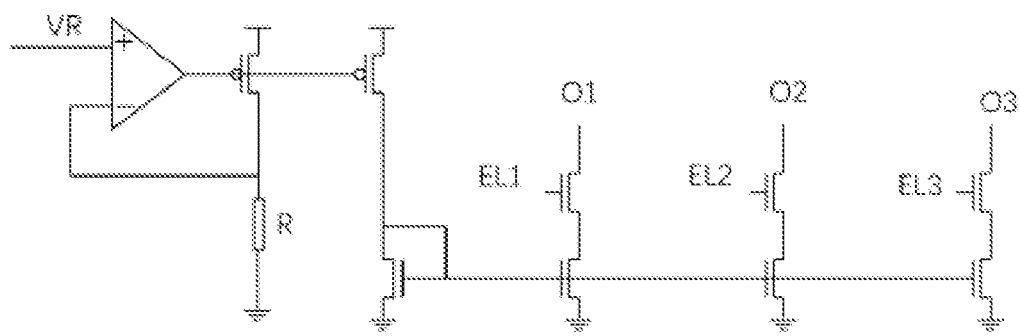
FIG. 18 is a schematic circuit diagram of a driving control circuit according to the present disclosure.

FIG. 18 shows a schematic circuit diagram of the driving control circuit 207. A specific working process of the driving control circuit 207 is well-known to those skilled in the art and will not be further described here.

The above describes the specific working processes of the embodiments of the present disclosure. It can be seen that the present disclosure achieves the purpose of two-wire control of the LED units, and the control method is simple and reliable. The requirements for the controller and the corresponding decoding circuits of the LED units are greatly lowered.

It can be understood that the above implementations are merely exemplary implementations used to illustrate the principles of the present disclosure, but the present disclosure is not limited thereto. For those of ordinary skill in the art, various modifications and improvements can be made without departing from the spirit and essence of the present disclosure, and these modifications and improvements are also deemed to fall within the protection scope of the present disclosure.

What is claimed is:

1. A light-emitting diode (LED) control system, comprising:
a controller and an LED light string electrically connected to the controller,
wherein the controller comprises a first data output port and a second data output port, and is configured to send a first data signal via the first data output port and send a second data signal via the second data output port; the first data signal and the second data signal have opposite phases; and
the LED light string is capable of receiving the first data signal and the second data signal via a data receiving port, implementing display control of LEDs of the LED light string according to the first data signal and the second data signal, and supplying power to the LEDs of the LED light string by performing power conversion on the first data signal and the second data signal;
wherein the LED light string comprises: N LED units connected in series; each LED unit comprises a first data receiving port and a second data receiving port; the first data receiving port of the first LED unit is configured to receive the first data signal, and the second data receiving port of the Nth LED unit is configured to receive the second data signal; and the second data receiving port of the first LED unit is connected in series with the first data receiving port of the Nth LED unit, wherein N is a natural number greater than or equal to 1.

2. The LED control system according to claim 1, wherein each of the LED units comprises a power conversion circuit, a data decoding circuit, a display control circuit, a driving control circuit, and an LED; two input ends of the power conversion circuit serve as the first data receiving port and the second data receiving port of the LED unit, respectively; an output end of the power conversion circuit is respectively connected to a power supplying end of the data decoding circuit and the power supplying end of the display control circuit; a data input end of the data decoding circuit is connected to the first data receiving port of the LED unit; a data output end of the data decoding circuit is connected to a data input end of the display control circuit; a data output end of the display control circuit is connected to a data input end of the driving control circuit; the driving control circuit is further connected to the first data receiving port and the second data receiving port of the LED unit, respectively; a data output end of the driving control circuit is connected to a negative electrode of the LED; a positive electrode of the LED is connected to the first data receiving port of the LED unit;
the power conversion circuit is capable of converting the first data signal and the second data signal into a power supplying source;
the data decoding circuit is capable of decoding the first data signal to obtain display control data;
the display control circuit is configured to generate driving control data according to the display control data; and
the driving control circuit is configured to generate a driving signal according to the driving control data, so that the LED is displayed according to the driving signal.

3. The LED control system according to claim 2, wherein the power conversion circuit comprises a first diode, a second diode, a third diode, a fourth diode, and a first capacitor; a negative electrode of the first diode is connected to the first data receiving port of the LED unit, and a positive electrode of the first diode is connected to a positive electrode of the third diode; a negative electrode of the third diode is connected to the second data receiving port of the LED unit; a positive electrode of the second diode is connected to the first data receiving port of the LED unit; a negative electrode of the second diode is connected to a negative electrode of the fourth diode; a positive electrode of the fourth diode is connected to the second data receiving port of the LED unit; one end of the first capacitor is connected to the negative electrode of the second diode, and the other end of the first capacitor is connected to the positive electrode of the first diode; and one end of the first capacitor is a positive power end of the power conversion circuit, and the other end of the first capacitor is a negative grounding end of the power conversion circuit.

4. The LED control system according to claim 2, wherein the data decoding circuit comprises an edge detection circuit, an oscillator, a counter, a comparator, and a shift register; an input end of the edge detection circuit is connected to the first data receiving end of the LED unit, and a data output end of the edge detection circuit is connected to the oscillator, the counter, and the shift register respectively; the counter is connected to the oscillator; the comparator is connected to the counter; and the shift register is connected to the comparator.

5. The LED control system according to claim 2, wherein the data decoding circuit comprises an edge detection circuit, an oscillator, a counter, a comparator, a shift register, and a reference bit processing circuit; an input end of the edge detection circuit is connected to the first data receiving end of the LED unit; a data output end of the edge detection circuit is connected to the oscillator, the counter, the reference bit processing circuit, and the shift register respectively; the counter is connected to the oscillator; the comparator is connected to the counter and the reference bit processing circuit respectively; and the shift register is connected to the comparator.

6. The LED control system according to claim 2, wherein the display control circuit comprises a reset code detection circuit, a display data register, and an on/off control circuit;

a data input end of the reset code detection circuit is connected to the first data receiving port of the LED unit; the display data register is connected to the reset code detection circuit; and the on/off control circuit is connected to the display data register.

7. The LED control system according to claim 1, wherein the controller comprises a voltage reducing unit, a data sending main control unit, a first switch transistor, a second switch transistor, a third switch transistor, a fourth switch transistor, a fifth switch transistor, a sixth switch transistor, a first resistor, and a second resistor; an input end of the voltage reducing unit is connected to a power end; an output end of the voltage reducing unit is connected to the data sending main control unit;

an output end of the data sending main control unit is respectively connected to a control end of the first switch transistor and a control end of the second switch transistor; a first end of the first switch transistor is connected to the power end through the first resistor; a second end of the first switch transistor is connected to a signal ground; a first end of the second switch transistor is connected to the power end through the second resistor; a second end of the second switch transistor is connected to the signal ground;

a control end of the third switch transistor and a control end of the fourth switch transistor are both connected to the first end of the first switch transistor; a first end of the third switch transistor is connected to the power end; a second end of the third switch transistor is connected to a first end of the fourth switch transistor and serves as the first data output port of the controller; a second end of the fourth switch transistor is connected to the signal ground;

a control end of the fifth switch transistor and a control end of the sixth switch transistor are both connected to the first end of the first switch transistor; a first end of the fifth switch transistor is connected to the power end; a second end of the fifth switch transistor is connected to a first end of the sixth switch transistor and serves as the second data output port of the controller; and a second end of the sixth switch transistor is connected to the signal ground.

8. The LED control system according to claim 7, wherein the data sending main control unit comprises a single-chip microcomputer.

9. The LED control system according to claim 7, wherein the first switch transistor, the second switch transistor, the fourth switch transistor, and the sixth switch transistor each comprise an N-type metal oxide semiconductor (MOS) transistor; and the third switch transistor and the fifth switch transistor each comprise a P-type MOS transistor.

* * * * *